(12) United States Patent
Merritt

(10) Patent No.: US 9,699,948 B1
(45) Date of Patent: Jul. 11, 2017

(54) TIPPED METAL IMPLEMENT

(71) Applicant: James R. Merritt, Lexington, NC (US)

(72) Inventor: James R. Merritt, Lexington, NC (US)

( * ) Notice: Subject to any disclaimer, the term of this patent is extended or adjusted under 35 U.S.C. 154(b) by 229 days.

(21) Appl. No.: 14/460,562

(22) Filed: Aug. 15, 2014

(51) Int. Cl.
*B05D 1/02* (2006.01)
*A01B 45/02* (2006.01)
*B05D 3/02* (2006.01)

(52) U.S. Cl.
CPC .............. *A01B 45/023* (2013.01); *B05D 1/02* (2013.01); *B05D 3/0254* (2013.01)

(58) Field of Classification Search
CPC ........ A01B 45/02; A01B 45/023; B05D 1/02; B05D 3/0254
See application file for complete search history.

(56) References Cited

U.S. PATENT DOCUMENTS

| | | | |
|---|---|---|---|
| 3,586,109 A | 6/1971 | Eversole | 172/22 |
| 6,165,286 A * | 12/2000 | Bayer et al. | C23C 4/18 148/220 |
| 6,691,791 B2 | 2/2004 | Bjorge | 172/1 |
| 7,640,994 B2 | 1/2010 | Maas et al. | 172/22 |
| 2010/0024614 A1 * | 2/2010 | Rex et al. | B26D 1/0006 83/13 |
| 2014/0224512 A1 * | 8/2014 | Skaff et al. | A01B 45/023 172/1 |
| 2015/0211105 A1 * | 7/2015 | Schier et al. | C23C 14/0641 428/141 |

* cited by examiner

*Primary Examiner* — Jessee Roe
*Assistant Examiner* — Jenny Wu
(74) *Attorney, Agent, or Firm* — Tuggle Duggins P.A.; Blake Hurt

(57) ABSTRACT

A metal implement such as an aeration tine formed from a hardened carbide tip affixed to a steel tine body is disclosed. The tine exterior surface is treated, such as by diffusion, with a hardening agent like aluminum-titanium-nitride and heating the tine to produce an implement that defines a hardness rating in excess of eight thousand (8,000) Vickers. The tip is attached to the body to form a tine. A method of manufacturing a tipped metal implement including the steps of providing a metal body and a hardened tip, treating substantially all of the body with a hardening agent, heating the body, and affixing the tip to an end of the metal body to form an implement that defines a hardness rating in excess of eight thousand (8,000) Vickers.

4 Claims, 2 Drawing Sheets

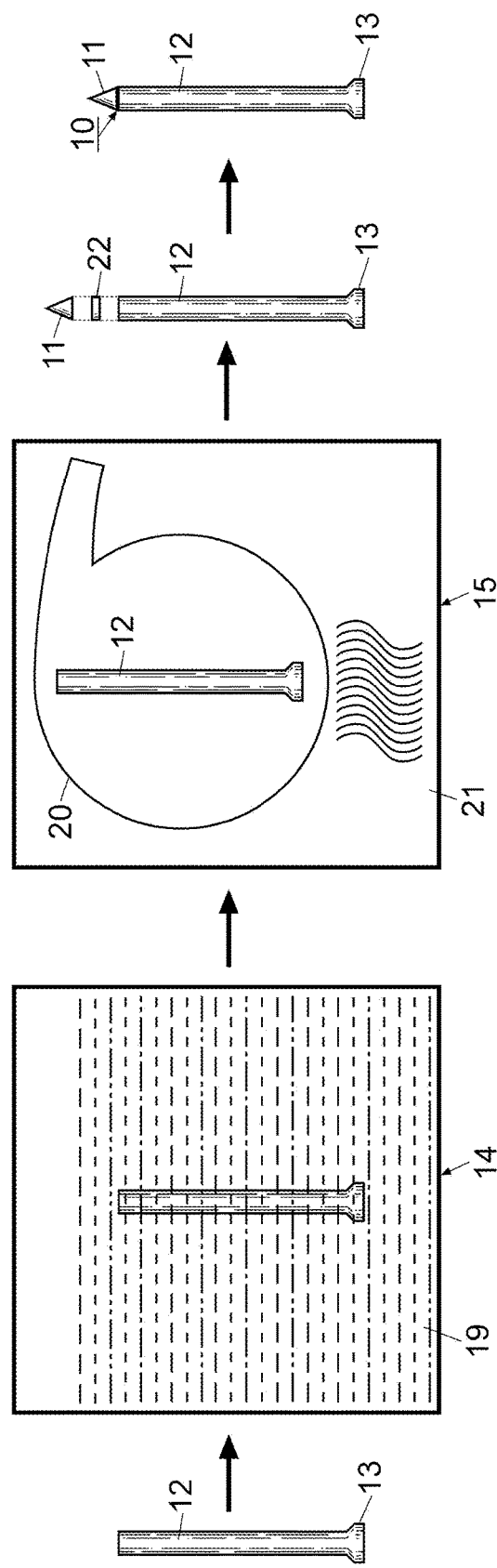

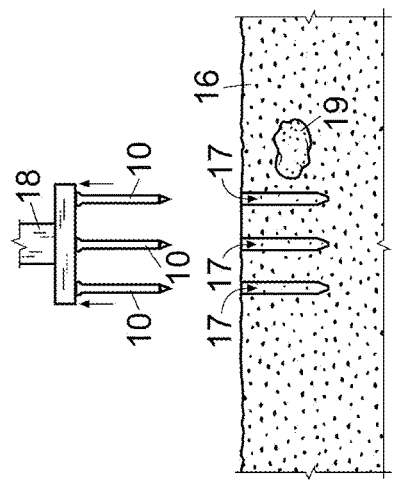
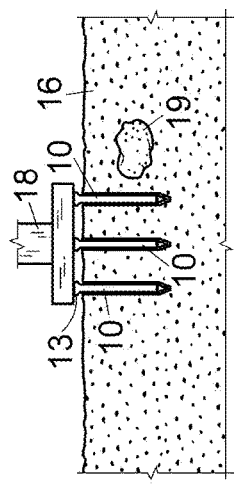
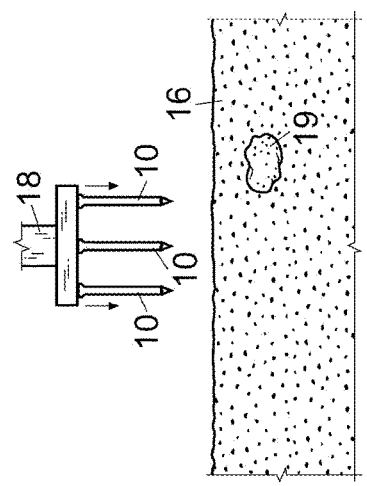
Fig. 2B
Fig. 2A
Fig. 2

US 9,699,948 B1

TIPPED METAL IMPLEMENT

FIELD OF THE INVENTION

The invention herein pertains to tipped metal implements and particularly pertains to an aeration tine for aerating turf and soil defining a lawn surface.

DESCRIPTION OF THE PRIOR ART AND OBJECTIONS OF THE INVENTION

Metal implements such as aeration tines are used to create openings in the ground to facilitate the movement of air, water, and gas for the purpose of aiding in the health and growth of vegetation such as grass, flowers, and the like. As would be understood, these tines are affixed to an aeration device (see U.S. Pat. Nos. 6,691,791 and 7,640,994 for examples) which propels the tine into the substrate, forming an opening. Repetitive insertions of the tine into the substrate causes continual wearing on the tine metal due to friction against the substrate, which may include rocks and roots in addition to soil. Such wearing changes the length and the diameter of the tine, and the operator has to replace the worn tine with a new tine to keep the substrate opening operation in an accurate manner. One of the conventional efforts to solve such a problem is to provide a hard wearing resistant ring element that is fixed to the end of the tine. For example, U.S. Pat. No. 3,586,109 describes a tine for being driven endwise into the turf, especially the turf of golf greens, which is characterized by the provision of an extremely hard wear-resistant element fixed to the working end of the tine. However, the geometry created upon entering the substrate by the tines described above leads to impact and wear along the length of the tine, bypassing the reinforced end section and leading to the need for replacement. Similarly, other conventional efforts to address the issue include dipping the tine tip in a harder, more wear-resistant material to create a more robust substrate engaging end. In addition to the geometry problem, which this approach does not solve, the tine tends to vibrate upon impact with the substrate, leading to structural weakness and chipping away of the dipped material. Therefore, none of the existing implements are satisfactory for long-term use.

Thus, in view of the problems and disadvantages associated with prior art devices, the present invention was conceived and one of its objectives is to provide a metal implement with a hardness treatment about the total working surface of the implement.

It is another objective of the present invention to provide an aeration tine with a hardness treatment for reducing the degradation of the tine surface from repeated insertion into a substrate.

It is still another objective of the present invention to provide a steel aeration tine boronized to a carbide tip.

It is yet another objective of the present invention to provide a tipped metal implement coated in aluminum titanium nitride.

It is a further objective of the present invention to provide a tipped metal implement coated in titanium nitride.

It is still a further objective of the present invention to provide a tipped metal implement coated in chromium nitride.

It is yet a further objective of the present invention to provide a tipped metal implement by a plasma/physical, vapor, and depravation (PVD) method.

It is another objective of the present invention to provide a method of forming a tipped metal implement by defusing a hardening agent into the implement and heating it.

It is a further objective of the present invention to provide a method of forming a tipped metal implement by defusing a hardening agent into the implement and electrifying it.

It is yet a further objective of the present invention to provide a method of forming a tipped metal implement defining a hardness rating in the range of seventeen hundred to eight thousand (1,700-8,000) Vickers.

Various other objectives and advantages of the present invention will become apparent to those skilled in the art as a more detailed description is set forth below.

SUMMARY OF THE INVENTION

The aforesaid and other objectives are realized by providing a metal implement such as an aeration tine formed from a hardened carbide tip affixed to a steel tine body. The tine exterior surface is treated, such as by diffusion, with a hardening agent like aluminum-titanium-nitride and heating the tine body to produce an aeration tine that defines a hardness rating between seventeen hundred and eight thousand (1,700-8,000) Vickers after the tip is attached to the tine body. A method of manufacturing a tipped metal implement including the steps of providing a metal body and a hardened tip, treating substantially all of the body with a hardening agent, heating the tine body, and affixing the tip to an end of the metal body to form an implement that defines a hardness rating between seventeen hundred and eight thousand (1,700-8,000) Vickers.

BRIEF DESCRIPTION OF THE DRAWINGS

FIG. 1 shows a schematic representation of a method of manufacturing a tipped metal implement;
FIG. 2 pictures a tipped metal implement in use;
FIG. 2a pictures a tipped metal implement in use; and
FIG. 2b pictures a tipped metal implement in use.

DETAILED DESCRIPTION OF THE PREFERRED EMBODIMENT AND OPERATION OF THE INVENTION

For a better understanding of the invention and its operation, turning now to the drawings, FIG. 1 shows a perspective view of preferred implement 10 including hardened tip 11 and metal body 12. Implement 10 is herein represented as an aeration tine but it should be understood that the instant invention and method of manufacture may apply to other hardened metal implements such as drill bits, saw blades and the like. As shown in FIG. 1, implement 10 may be oriented to pierce the surface of a substrate, for example by attaching to an aeration device as is known in the art (not shown).

Typically, implement 10 repeatedly punctures substrate 16, such as a residential lawn or golf course, for creating opening 17 or hole therein. This allows air, water, nutrients, and other beneficial microbes access to the root system of a growing organism, often increasing the health of the organism in the process. It is conventional to use repeating or rotating aeration device 18 (see FIGS. 2-2B) that results in implement 10 being inserted and removed several times during the perforation or aeration process. Depending on the angle of entry into the substrate, substrate 16 itself imparts substantial, and potentially violent, wear at hardened tip 11, but also due to the depth of penetration along the majority of metal body 12 as well. Further, impact with harder subterranean objects 19 such as tree roots, stones, and the like decrease the lifespan of a usable implement prior to replacement. Regardless of the angle of entry, implements with reinforced tips such as hardened tip 11 are subject to vibration upon contact with the substrate. Repeated puncture and removal from the substrate leads to oscillation at different frequencies (known as resonance) of tip materials compared to body materials. Over time, this oscillation and subsequent flexion in the body and tip causes flaking of dipped treatments and fracturing of implements.

As shown, preferred implement 10 is formed from tip 11 which is formed from a hardened, wear-resistant material such as tungsten carbide which defines a greater wear resistance than steel. Hardened tip 11 is affixed to an end of cylindrical metal body 12. This attachment may be performed with adhesives, welding, mechanical engagement such as with complementary threaded ends, mechanical fasteners, or other means of connection as known in the art (not shown). This type of implement does not address the problem solved by the instant invention. Therefore, it is necessary to encase substantially all of metal body 12 in a hardening agent that results in preferred implement 10 as illustrated at the conclusion of FIG. 1. "Substantially all" of body 12 includes all surfaces that are likely to come into contact with substrate 16 during the normal functioning of implement 10, but not the attachment structures, for example shoulder 13 which is formed at the end of metal body 12 opposite tip 11 and is utilized to secure implement 10 to an aeration device.

Metal body 12 is preferably cleaned down to the base metal, for example with the use of a grinder or other mechanical method or a chemical treatment designed to strip away surface impurities or imperfections and is then dipped, sprayed, coated, or otherwise treated with a treatment mixture composed of one or more hardening agents to increase the hardness score of preferred implement 10 in the range between seventeen hundred and eight thousand (1,700-8,000) Vickers, and preferably in excess of three thousand two hundred (3,200) Vickers, resulting in a most preferred hardness range between three thousand two hundred and eight thousand (3,200-8,000) Vickers. Hardening slurry 19 is represented schematically in FIG. 1 at treatment site 14 and ingredients may include liquefied, molten, or aerosol tin, chrome, boron, nitrogen, carbon, titanium, tungsten, aluminum, or combinations thereof. The list of ingredients is intended as illustrative and should not be viewed as the exclusive components used at treatment site 14. In an alternate embodiment, metal body 12 may be dried and heated, for example to two hundred degrees Fahrenheit (200° F.) prior to being treated at treatment site 14, particularly if slurry 19 is administered via spray. The treatment may be applied as a coating, which causes the outside diameter of implement 10 to increase by at least a few thousandths of a centimeter, or the treatment may be diffused into the surface of implement 10 which results in a much reduced increase of the outer diameter, for all practical purposes no increase although with the diffused atoms being added to the surface of metal body 12, it may be scientifically accurate to describe the increase in diameter in a few picometers.

The treatment dries on the surface of metal body 12 after a period of time and may be placed into a heated environment such as furnace 15 to accelerate the drying process. In an alternate embodiment of furnace 15, metal body 12 may be exposed to an atmosphere containing an excess of a particular element, mineral, substance. For example, implement 10 may be placed within retort 20 inside furnace 15 and heated in excess of fifteen hundred degrees Fahrenheit (1500° F.), and preferably heated to seventeen hundred degrees Fahrenheit (1700° F.) while the general atmosphere (comprised of nitrogen, oxygen, carbon dioxide, etc. as is known) is removed and replaced with inert gas-rich atmosphere 21 such as a nitrogen rich atmosphere (an atmosphere is considered "nitrogen rich" if it defines a nitrogen concentration in excess of 90% saturation by unit volume, and preferably in excess of 99% saturation by unit volume). The inert gas prevents the buildup of moisture or other contaminants that may lead to structural imperfections or rust in the presence of oxygen.

Metal body 12 is heated to the specified drying temperature over a period of time, for example three (3) hours, and is dried for a period of time, for example greater than four (4) hours, such as six (6) hours and preferably eight (8) hours, to ensure that the hardening agents such as boron are infused into the exterior surface of body 12. A vacuum approximately equal to one atmosphere may be exerted on implement 10 while in furnace 15 to assist in the infusing process. Metal body 12 may also be heated to a temperature greater than five hundred degrees Fahrenheit (500° F.), and preferably above twelve hundred degrees Fahrenheit (1200° F.) for at least one (1) hour but not more than two (2) hours before being removed from furnace 15. An embodiment of metal body 12 may be quenched in oil (not shown) and may be tempered at a temperature of approximately twelve hundred degrees Fahrenheit (1200° F.) before being air cooled.

An alternate embodiment of implement 10 may be formed by a physical vapor deposition (PVD) method instead of the heating, coating, and infusing process described above. By evaporating slurry 19 at treatment site 14 by heating until all the components exist as a gas phase in a high-temperature vacuum, slurry 19 can be deposited on the surface of metal body 12 in thin layers comparable to those in the diffusion process. The PVD heat source is typically a plasma flame or a bolt of electricity, resulting in very high temperatures (in excess of seventeen thousand five hundred degrees Fahrenheit (17,500° F.)) for very short periods of time. This physical process results in the slurry components condensing and then hardening on metal body 12, resulting in a harder and more durable work surface than defined by other tines in the art. Variations of the PVD process that are contemplated within the scope of this invention include cathodic arc deposition, electron beam physical vapor deposition, evaporative deposition, pulsed laser deposition, and putter deposition.

A method of manufacturing tipped metal implement 10 such as an aeration tine or drill bit is also provided. The method includes the steps of mechanically or chemically cleaning metal body 12 to the base metal such that no impurities or surface imperfections exist. A hardening slurry mixture 19 formed from compounds such as liquefied, molten, or aerosol tin, chrome, boron, nitrogen, carbon, titanium, tungsten or aluminum is applied to metal body 12, which may be heat fused upon completion of the hardening process with hardened tip 11. This application may take the form of dipping, coating, spraying, or the like. Preferred metal body 12 is placed in furnace 15, ideally in retort 20, and heated above fifteen hundred fifty degrees Fahrenheit (1550° F.), and preferably to seventeen hundred degrees Fahrenheit (1700° F.) over the course of three (3) hours and ideally for six to eight (6-8) hours. In an embodiment of the current method, metal body 12 remains in furnace 15 but is removed from retort 20 at five hundred degrees Fahrenheit (500° F.) for one (1) hour to further cure and dry. In an alternate embodiment, metal body 12 is removed from furnace 15 before being heat treated at twelve hundred degrees Fahrenheit (1200° F.) for two (2) hours and then quenched in oil. In an embodiment of this method, metal body may be heated again to twelve hundred degrees Fahrenheit (1200°) before being cleaned, affixed to hardened tip 11, for example with soldering material 22 and a heat-activated jelly-flux, and distributed for use.

Embodiments of manufacturing tipped implement 10 may include heating metal body 12 to two hundred degrees Fahrenheit (200° F.) after cleaning and spraying a tungsten alloy hardening mixture with a high pressure, high-velocity oxygen fuel (HP/HVOF) application. Alternate embodiments include the steps of vacuuming the atmosphere out of furnace 15 and inserting inert gas atmosphere 21 such as nitrogen inside therein during the heating of metal body 12. Alternatively, hardening slurry 19 may be affixed to body 12 by evaporating the slurry at treatment site 14 via heating until all the components exist as a gas phase in a high-temperature vacuum. The slurry components are then deposited on metal body 12 in thin layers comparable to those in the diffusion process. Coloring such as gold or silver may be added to distinguish the treatment between implements 10, for example to indicate the difference between slurry treatments. The resulting implements 10 have a hardness score in the range of seventeen hundred to eight thousand (1,700-8,000) Vickers and more preferably in excess of three thousand (3,000) Vickers and most preferably between three thousand two hundred and eight thousand (3,200-8,000) Vickers. Creating implement 10 with a significant hardness score (i.e. above three thousand (3,000) Vickers) prevents implement 10 from flexing during use and causing the hardening agent from cracking or flaking off. Treating substantially all of metal body 12 results in more hardening agent being utilized, which is one reason why it has not been developed in the implement industry.

The illustrations and examples provided herein are for explanatory purposes and are not intended to limit the scope of the appended claims.

I claim:

1. A method of forming an aeration tine comprising the steps of, providing a cylindrical metal body defining a first terminal end, a second terminal end positioned in opposing relation to the first terminal end, and a shoulder oriented contiguous the second terminal end, an outer diameter defined by the shoulder greater than an outer diameter defined by the cylindrical metal body;

mechanically or chemically cleaning the cylindrical metal body; providing a hardening slurry selected from a group consisting of tin, chrome, boron, nitrogen, carbon, titanium, tungsten, aluminum, and combinations thereof;

treating substantially all the cylindrical metal body with the hardening slurry by dipping, spraying, diffusing, or coating up to, but not including, the shoulder; providing a retort;

placing the cylindrical metal body in the retort within a furnace heating the cylindrical metal body to seventeen hundred degrees Fahrenheit for six to eight hours while replacing an atmospheric composition comprised of nitrogen, oxygen and carbon dioxide with an inert nitrogen-rich environment;

exerting a vacuum approximately equal to one atmosphere of pressure; removing the cylindrical metal body from the retort and heating the cylindrical metal body above five hundred degrees Fahrenheit for at least one hour;

affixing a harden tip formed from tungsten carbide to the first terminal end of the cylindrical metal body.

2. The method of claim 1 further comprising a step of heating the cylindrical metal body at two hundred degrees Fahrenheit before being treated with the hardening slurry.

3. The method of claim 2 wherein the step of heating the cylindrical metal body after removal from the retort further comprises heating the cylindrical metal body above twelve hundred degrees Fahrenheit for at least one but no more than two hours before removing the cylindrical metal body from the furnace.

4. The method of claim 1 wherein the step of heating the cylindrical metal body after removal from the retort further comprises quenching the cylindrical metal body in oil before tempering at a temperature of approximately twelve hundred degrees Fahrenheit before removing the cylindrical metal body for air cooling.

* * * * *